United States Patent
Mizukami et al.

(10) Patent No.: US 7,613,541 B2
(45) Date of Patent: Nov. 3, 2009

(54) THREAD CONTROL METHOD AND SYSTEM THEREFOR

(75) Inventors: Yuji Mizukami, Tokyo (JP); Hiroshi Hashimoto, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 755 days.

(21) Appl. No.: 10/550,540

(22) PCT Filed: Mar. 28, 2003

(86) PCT No.: PCT/JP03/04005

§ 371 (c)(1),
(2), (4) Date: Sep. 26, 2005

(87) PCT Pub. No.: WO2004/087359

PCT Pub. Date: Oct. 14, 2004

(65) Prior Publication Data

US 2006/0210370 A1 Sep. 21, 2006

(51) Int. Cl.
*G06F 19/00* (2006.01)
(52) U.S. Cl. ............ 700/193; 700/159; 318/571
(58) Field of Classification Search ................. 700/159, 700/192–193; 409/70; 318/625, 569, 571, 318/574, 575
See application file for complete search history.

(56) References Cited

U.S. PATENT DOCUMENTS

| 5,307,549 A | * | 5/1994 | Tsutsumi et al. ............ 29/27 C |
| 6,847,857 B2 | * | 1/2005 | Sugie .......................... 700/160 |
| 7,123,984 B2 | * | 10/2006 | Tanaka ........................ 700/193 |

FOREIGN PATENT DOCUMENTS

| JP | 57-79507 A | 5/1982 |
| JP | 58-177252 A | 10/1983 |
| JP | 60-175103 A | 9/1985 |
| JP | 62-99020 A | 5/1987 |

OTHER PUBLICATIONS

"Machine Tool Design Manual", Mar. 1998, pp. 14-145.

* cited by examiner

*Primary Examiner*—Paul L Rodriguez
*Assistant Examiner*—Sheela Rao
(74) *Attorney, Agent, or Firm*—Sughrue Mion, PLLC (57) ABSTRACT

In a threading control system for performing a threading operation by moving, in synchronization with rotation of the main-spindle, either a cutter or a workpiece in the feeding spindle direction so that the ridge is not damaged nor the dimensional accuracy of the thread is lowered even if the main-spindle speed is variable, a threading computing section 3 and a main-spindle angle computing section 4 are provided to alter the threading start timing based on the servo-spindle acceleration time-constant of the feeding spindle.

14 Claims, 6 Drawing Sheets

THREAD CONTROL METHOD AND SYSTEM THEREFOR

TECHNICAL FIELD

The present invention relates to threading control methods and systems therefor, and particularly to threading control in a machine tool controlled by a numerical control (hereinafter referred to as an NC) system or the like.

BACKGROUND ART

In a threading operation using an NC system, as is well known, a threading workpiece is held by a chuck provided in the main spindle, the threading workpiece is rotated by the main spindle being rotated, and a cutter (turning tool) moved by a servo spindle driven by a feeding servo motor is moved axially (Z-axis direction) so as to be synchronized with the rotation of the main spindle. However, if the rotation of the main spindle and the Z-axis direction movement of the cutter are not synchronized, the dimensional accuracy of the thread is degraded, or a double thread is formed or the ridge is damaged in finish machining.

Therefore, in the threading operation, it is required, for instance, to start moving the cutter in the Z-axis direction based on a single-rotation signal generated in every rotation of the main spindle, and to synchronize the rotation of the main spindle with the feeding of the cutter.

In addition, in transitioning from rough machining to finish machining, for example, when the rotational speed of the main spindle is increased a predetermined number of times, the feed rate of the cutter is also increased the predetermined number of times in order to synchronize the rotation of the main spindle and the feeding of the cutter. However, at this time, discrepancy occurs between the servo delay in the feed rate (low speed) of the cutter in the rough machining and the servo delay in the feed rate (high speed) of the cutter in the finish machining, so that thread phase displacement arises.

For this reason, a method has been disclosed in Japanese Patent Laid-Open No. 177252/1983, in which, given that an amount of servo delay for the feeding motor actual speed in the finish machining to reach fL (feed rate in finishing) is dL (=fL/k, where k is a gain in the servo system), and the main-spindle rotational speed is θL, by positioning the cutter stop position before the finish machining apart from the workpiece by above dL, the actual speed reaches the constant speed fL at the rotational angle θL after generation of a single-rotation signal, and the threading is started from the rotational angle θL at the constant speed fL; meanwhile, given that an amount of the servo delay for the feeding motor actual speed in the rough machining to reach fs (feed rate in rough machining, fs<fL) is ds (=fs/k, where k is a gain in the servo system), and the main-spindle rotational speed is θs, by positioning the cutter stop position before the rough machining apart from the workpiece by above ds, the actual speed reaches the constant speed fs at the rotational angle θL after generation of a single-rotation signal, and the threading is started from the rotational angle θL at the constant speed fs.

Moreover, a method has been disclosed, in which, introducing the above-described idea, even if the cutter stop position before starting threading in the finish machining is identical to that in the rough machining, by controlling the generation point of the single-rotation signal of the main spindle, when performing the finish machining, the threading is started from the rotational angle θL at a constant speed fL, meanwhile, when performing the rough finish machining, the threading is started from the rotational angle θL at a constant speed fs.

In short, in Japanese Patent Laid-Open No. 177252/1983, a technology is disclosed, in which thread phase displacement is prevented by taking into account the amount of the servo delay, even if the rotational speed of the feeding motor is variable.

Moreover, as a conventional technology regarding remachining of a thread, there is a technology disclosed in Japanese Patent Laid-Open No. 99020/1987.

In the technology, in remachining a thread, an amount of phase displacement of the thread groove in the threaded portion, generated in mounting the threaded workpiece, is measured; the amount of delay in the servo system for the numerical control machine tool and the computational delay time in the numerical control system (delay amount from the detection of the pulse data of the main-spindle rotational frequency to the completion of the computation) are computed; based on the above-described phase displacement, the above-computed delay in the servo system, and the above-computed computational delay time, the phase displacement amount is calculated; and the phase of the above-described threaded portion is aligned based on the phase displacement amount, to remachine the threaded portion.

With regard to the phase displacement amount, the actual phase displacement amount δt is calculated according to the following equation from the phase displacement amount of the threaded portion δi (mm) generated by remounting the workpiece, the delay amount of the servo system $S_D$ (mm), the delay amount S1 from the detection of the pulse data of the main-spindle rotational frequency to the completion of the computation, and the servo feed rate F.

$$\delta t = \text{remainder of } (\delta i + S1 + S_D)/F$$

Here, F is calculated as below.

$$F = (\text{thread pitch command}) \times (\text{main-spindle rotational frequency})$$

In Japanese Patent Laid-Open No. 99020/1987, a technology as above is disclosed.

Meanwhile, in the conventional technology (the technology disclosed in Japanese Patent Laid-Open No. 177252/1983), as described above, only the servo system delay has been considered in order to prevent thread phase displacement, so that a problem has been that thread phase displacement still arises.

Figure 6:
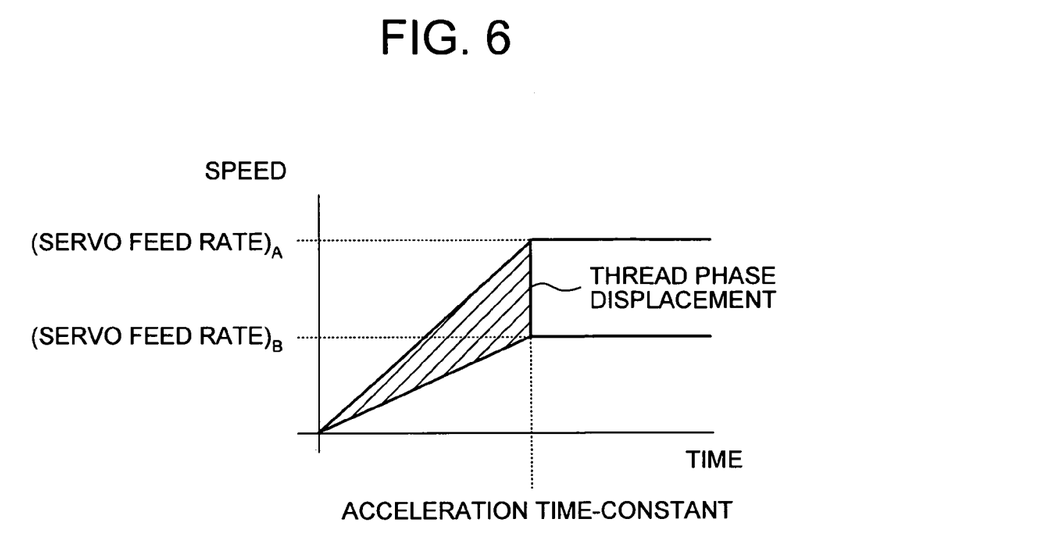
FIG. 6 is a diagram for explaining the threading phase displacement when the threading speed is changed.

Incidentally, in the above-described technology (the technology disclosed in Japanese Patent Laid-Open No. 177252/1983), because only the servo system delay has been considered, if the acceleration time-constant when the servo feed rate is (servo feed rate)$_A$ (in finish machining of the thread) is identical to that when the servo feed rate is (servo feed rate)$_B$ (in rough machining of the thread), then thread phase displacement due to the acceleration/deceleration time-constant arises between when the servo feed rate is (servo feed rate)$_A$ (in finish machining of the thread) and when the servo feed rate is (servo feed rate)$_B$ (in rough machining of the thread) as illustrated in FIG. 6.

Figure 7:
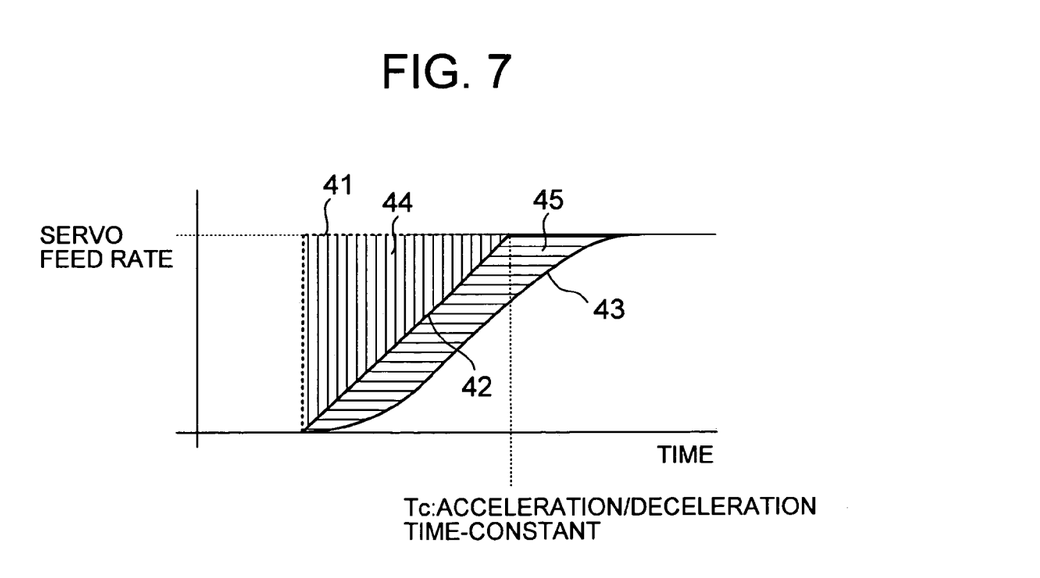
FIG. 7 is a diagram illustrating the delay due to the servo-spindle acceleration time-constant and the servo response delay.

Moreover, also in the thread remachining technology disclosed in Japanese Patent Laid-Open No. 99020/1987, the amount of the phase displacement of the threaded portion, generated by remounting the workpiece, the servo system delay amount, and the delay amount from the detection of the pulse data of the main-spindle rotational frequency to the completion of the computation have only been considered, so that the thread phase displacement 44 due to the acceleration/ deceleration time-constant arises as illustrated in FIG. 7.

In addition, FIG. 7 illustrates an example of a linear acceleration/deceleration profile, in which numeral 41 denotes a stepped command-feed-rate profile commanded by a program; numeral 42 denotes an output speed profile to the servo, accelerated/decelerated by a time constant Tc based on the command; numeral 43 denotes a servo operational speed profile, delayed by the servo response delay; numeral 45 denotes an amount of the phase displacement due to the servo response delay; and numeral 44 denotes the thread phase displacement amount due to the acceleration/deceleration time-constant.

DISCLOSURE OF THE INVENTION

The present invention is for resolving the problems as described above, and aims to obtain a threading control method and a system therefor, in which the threading accuracy can be enhanced, even if the feed rate of the feeding spindle varies (in rough machining, in finish machining, and the like), or even if a threaded workpiece that has once been dismounted from the machine is mounted again on the machine to be threaded, or the thread is refinished on another machine.

For this purpose, the threading control method according to the present invention alters the threading start timing based on at least the servo-spindle acceleration time-constant of the feeding spindle.

Moreover, the threading control system according to the present invention has a configuration including a means for altering the threading start timing based on the servo-spindle acceleration time-constant of the feeding spindle.

Accordingly, even if the feed rate of the feeding spindle varies, or even if a threaded workpiece that has once been dismounted from the machine is mounted again on the machine to be threaded, or the thread is refinished on another machine (in a case in which mechanical characteristics such as a gain and a time constant are different from those of the previously used machine), error due to the servo-spindle acceleration time-constant can be corrected, so that the threading accuracy can be enhanced.

Moreover, the threading control method according to the present invention alters the threading start timing based on at least the servo-spindle acceleration time-constant and mechanical error of the feeding spindle.

Furthermore, the threading control system according to the present invention has a configuration including a means for altering the threading start timing based on the servo-spindle acceleration time-constant and the mechanical error of the feeding spindle.

Accordingly, even if the feed rate of the feeding spindle varies, or even if a threaded workpiece that has once been dismounted from the machine is mounted again on the machine to be threaded, or the thread is refinished on another machine, the error due to the servo-spindle acceleration time-constant can be corrected, so that the threading accuracy can be enhanced. In addition; the mechanical error that is the difference between the command position and the actual position of the front edge of the cutter, generated at start of the cutter movement by the time the cutter starts to operate due to a static frictional force, an inertia force, or the like, can be corrected, so that the threading accuracy can be further enhanced.

BEST MODE FOR CARRYING OUT THE INVENTION

Embodiment 1

Hereinafter, Embodiment 1 of the present invention will be described in reference to FIG. 1 and FIG. 2.

In Embodiment 1 of the present invention, in the control of an NC system having a threading function and a main-spindle override function, with respect to variation in feed rate of the servo spindle generated from the difference between a main-spindle rotational frequency command value commanded in a threading program for machining a plurality of times, and a main-spindle rotational frequency value actually used in machining, modified by the main-spindle override, by converting the difference in servo-following delay amount and the difference in movement amount due to the servo acceleration time-constant into main-spindle angles, and by shifting threading start timing, the positional relation between the threaded portion and the front edge of the cutter is never altered, even if the main-spindle rotational frequency is changed by the main-spindle override before starting threading.

Figure 1:
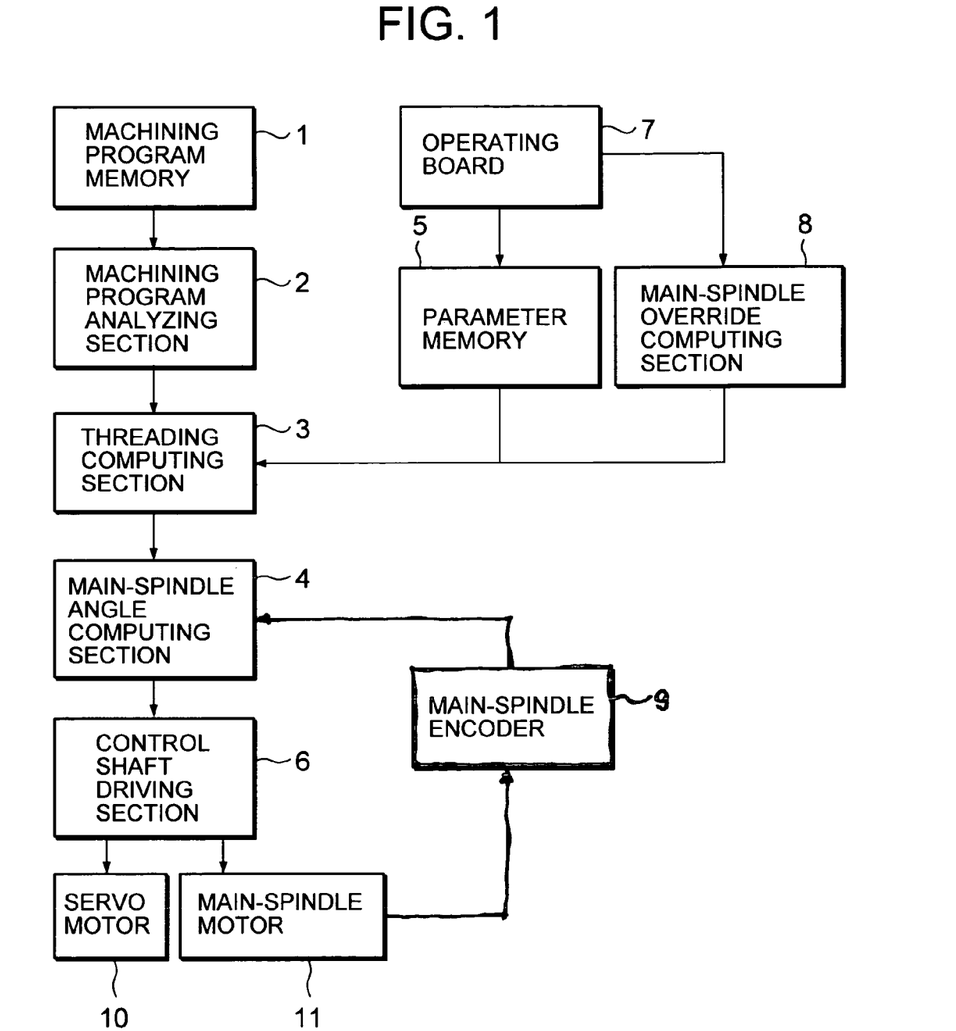
FIG. 1 is a block diagram illustrating an example of a configuration relevant to Embodiment 1 and Embodiment 2 of the present invention.

More specifically, in a machining program memory 1 illustrated in FIG. 1, a machining program (machining program including threading commands for a plurality of times of machining) is stored in advance, and, when the machining program 1 is executed, the machining program is sequentially read out from the machining program memory 1 and analyzed by a machining program analyzing section 2. When a threading command is analyzed, the feed rate of the threading servo spindle for the main-spindle command rotational frequency is computed in a threading computing section 3.

The main-spindle override inputted from an operating board 7 is converted by the main-spindle override computing section 8 into a rotation ratio of the main-spindle rotational frequency, from which together with the result computed in the threading computing section 3, an amount of displacement in the positional relation between the threaded portion and the front edge of the cutter, due to variation in the main-spindle rotational frequency, is calculated in a main-spindle angle computing section 4, and the threading start timing is altered. Then, a movement start command for a servo spindle (feeding spindle for moving the cutter in the Z-axis direction) is outputted to a control shaft driving section 6, which drives a servo motor 10 to move the servo spindle. Moreover, a main-spindle velocity command is outputted to a main-spindle motor 11 to drive the main spindle (spindle for rotating a workpiece). Furthermore, the rotational frequency of the main spindle is detected by a main-spindle encoder 9, and fed back to the main-spindle angle computing section 4.

Figure 2:
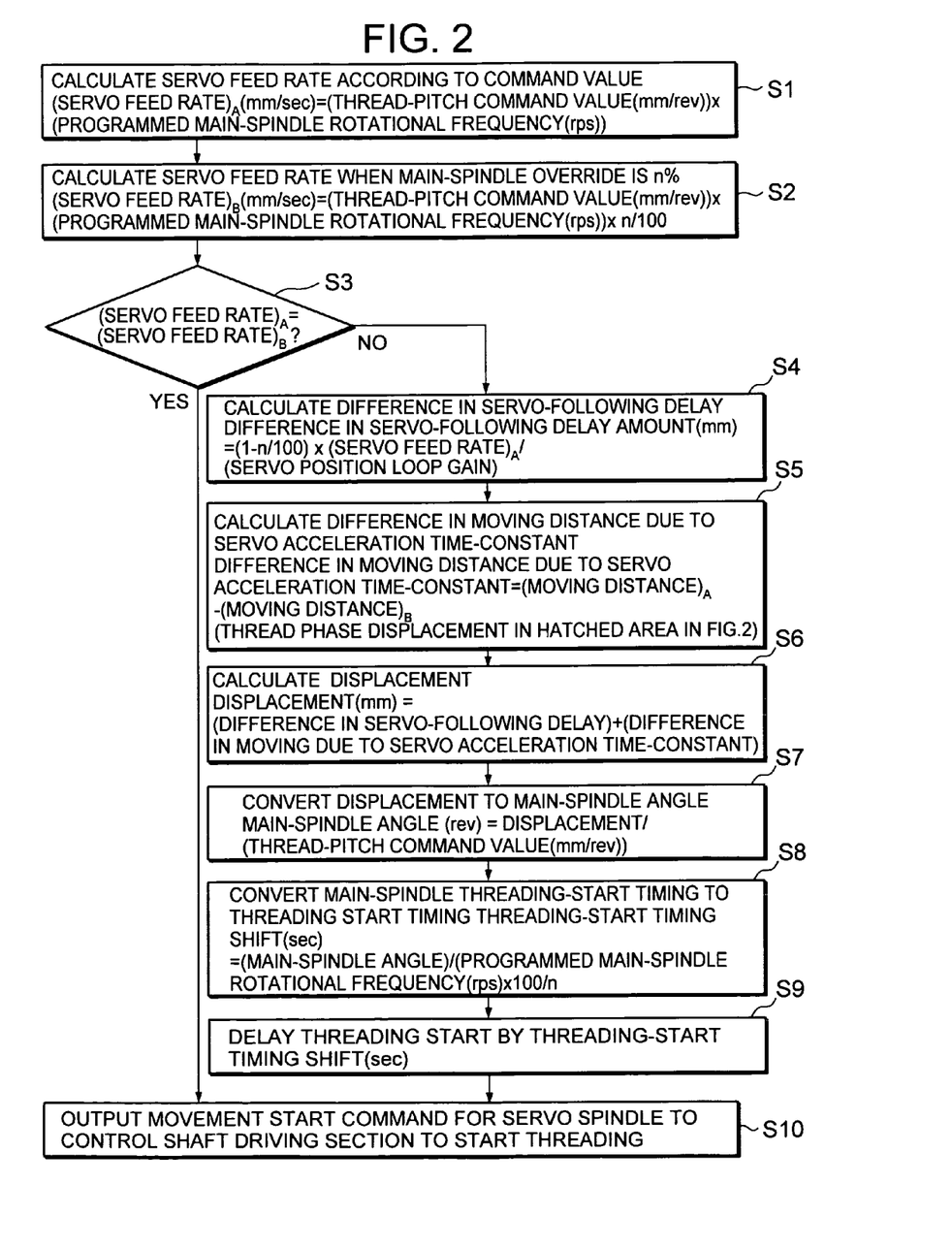
FIG. 2 is a flowchart for explaining operations relevant to Embodiment 1 and Embodiment 2 of the invention.

FIG. 2 describes a control operation performed in the threading computing section 3 and in the main-spindle angle computing section 4 with a flowchart.

In FIG. 2, step S1 describes an operation for calculating the servo feed rate, performed in the threading computing section 3, and step S2 through step S10 describe an operation, performed in the main-spindle angle computing section 4, for altering the threading start timing with respect to the override change.

With regard to the NC system configured as described above, firstly, the operation when the main-spindle override is 100% is designated from the operating board 7, in other words, when the same value as the programmed main-spindle rotational frequency is designated, will be described.

The main-spindle rotational frequency command value and a thread pitch command value are outputted from the machining program analyzing section 2. The threading computing section 3 determines the feed rate of the servo spindle. Firstly, the feed rate according to a program command value is calculated in step S1 using the following computing equation.

(servo feed rate)$_A$(mm/sec)=(thread-pitch command value (mm/rev))×(programmed main-spindle rotational frequency (rps))

Next, the main-spindle angle computing section 4 calculates the amount of time for the threading start timing to be delayed. Firstly, a servo feed rate when the main-spindle override is n %, transferred from the main-spindle override computing section 8 is calculated in step S2. The following computing equation is derived from the rotation ratio of the main-spindle rotational frequency.

(servo feed rate)$_B$(mm/sec)=(thread-pitch command value (mm/rev))×(programmed main-spindle rotational frequency (rps))×n/100

This time, because a case in which the main-spindle override n equals 100% is described, it is determined in step S3 that (servo feed rate)$_A$ equals (servo feed rate)$_B$. Consequently, in the main-spindle angle computing section 4, the main-spindle rotational angle for adjusting the threading start timing becomes zero, so that a movement start command for the servo spindle is outputted without altering the timing to the control shaft driving section 6.

Next, the operation when the main-spindle override is n % is designated from the operating board 7, in other words, when n/100 of the program main-spindle rotational frequency is commanded, will be described.

The main-spindle rotational frequency-command value and a thread-pitch command value are outputted from the machining program analyzing section 2 to the threading computing section 3. The threading computing section 3 determines a feed rate for the servo spindle. Firstly, the feed rate according to a program command value is calculated in step S1 according to the following computing equation.

(servo feed rate)$_A$(mm/sec)=(thread-pitch command value (mm/rev))×(programmed main-spindle rotational frequency (rps))

Next, the main-spindle angle computing section 4 calculates the amount of shifting the threading start timing. Firstly, a servo feed rate when the main-spindle override is n %, transferred from the main-spindle override computing section 8, is calculated in step S2. The following computing equation is derived from the rotation ratio of the main-spindle rotational frequency.

(servo feed rate)$_B$(mm/sec)=(thread-pitch command value (mm/rev))×(programmed main-spindle rotational frequency (rps))×n/100

Because the rotation ratio of the main-spindle rotational frequency is n % this time, the relation "(servo feed rate)$_A$= (servo feed rate)$_B$×100/n" applies. It is determined in step S3 that (servo feed rate)$_A$ does not equal (servo feed rate)$_B$, so that processes in step S4 through step S9 are performed. Firstly, servo-following delay amounts are present, which are calculated in step S4 according to the following computing equations.

(servo-following delay amount)$_A$(mm)=(servo feed rate)$_A$/(servo position loop gain)

(servo-following delay amount)$_B$(mm)=(servo feed rate)$_B$/(servo position loop gain)

Accordingly, the difference in servo-following delay amount is expressed by the following computing equation.

difference in servo-following delay amount (mm)= (servo-following delay amount)$_A$−(servo-following delay amount)$_B$=(1−n/100)×(servo feed rate)$_A$/ (servo position loop gain)

In addition, the computation result is used in step S6 described later. Moreover, the servo position loop gain stored in a memory not shown in the figure is read out to be used as the servo position loop gain used in computing the difference in the servo-following delay.

Furthermore, the main-spindle angle computing section 4 calculates delay due to the servo-spindle acceleration time-constant. In general, as illustrated in FIG. 6, a servo-spindle acceleration time-constant is designated to be the time to reach (servo feed rate)$_A$, which is a command speed. Moreover, a servo-spindle acceleration time-constant stored in a memory not shown in the figure is read out to be used as the servo-spindle acceleration time-constant. Furthermore, the servo-spindle acceleration time-constant is machine-specific data determined by the mechanical property, and not a value varying every machining operation, so that the moving amount with respect to time varies according to the servo feed rate. The varying amount is calculated in step S5 according to the following computing equation. The moving distance for the servo feed rate to reach (servo feed rate)$_A$ is expressed in the equation below.

(moving distance)$_A$ (mm)=(servo feed rate)$_A$×(acceleration time-constant)/2

Meanwhile, when a command to designate the main-spindle override to be n % is inputted from the operating board 7, (moving distance)$_B$ for the servo feed rate to reach (servo feed rate)$_B$ is expressed in the equation below.

(moving distance)$_B$ (mm)=(servo feed rate)$_B$×(acceleration time-constant)/2

More specifically, if the servo feed rate varies, the positional relation between the threaded portion and the front edge of the cutter are misaligned by the distance, where (difference in moving distance due to the servo acceleration time-constant)=(moving distance)$_A$−(moving distance)$_B$ (thread phase displacement amount in the hatched area in FIG. 6). Accordingly, when the positional relation between the threading workpiece and the front edge of the cutter must be the same in machining, the same trajectory cannot be passed unless the amount is corrected, because the moving amount per unit time differs. The computation result is used in step S6 described later.

The threading start timing is computed from the difference in the servo-following delay (step S4) and the difference in the moving distance due to the servo acceleration time-constant (step S5), which have been computed by the main-spindle angle computing section 4.

Firstly, the amount of displacement in the positional relation between the threaded portion and the front edge of the cutter is calculated in step S6 according to the equation below.

displacement amount (mm)=(servo-following delay difference)+(moving distance difference due to the servo acceleration time-constants)

If the threading start position is moved by this displacement amount, the machining without displacement in the positional relation between the threaded portion and the cutter can be performed; however, in Embodiment 1 of the invention, by altering the threading start timing without moving the machining start position, the machining without positional relation displacement between the threaded portion and the cutter is performed. A method therefor will be described below.

Firstly, the displacement amount is converted into the main-spindle angle in step S7.

main-spindle angle (rev)=(displacement amount)/(thread-pitch command value (mm/rev))

Next, the main-spindle angle is converted in step S8 into the threading-start timing shift according to the following computing equation. The main-spindle rotational frequency when machining the thread is "(programmed main-spindle rotational frequency (rps))×100/n", so that the following equation is derived.

threading-start timing shift (sec)=(main-spindle angle)/(programmed main-spindle rotational frequency (rps)×100/$n$)

In step S9, the main-spindle angle computing section 4 outputs to the control shaft driving section 6 the movement start command for the servo spindle delayed by the threading-start timing shift (sec).

In addition, in order to delay the time by the threading-start timing shift (sec), when, for example, the servo spindle is configured so as to start to move in the Z-axis direction in synchronization with a single-rotation signal (Z-phase signal) generated in every rotation of the main spindle, it is only necessary that the rotation of the main spindle is fed back from the encoder 9 to the main-spindle angle computing section 4, and the movement start command for the servo spindle is outputted to the control shaft driving section 6, delayed by the threading-start timing shift (sec) after the reception of the single-rotation signal (Z-phase signal).

As described above, by altering the threading start timing, the machining without displacement in the positional relation between the threaded portion and the cutter is performed.

Embodiment 2

Next, Embodiment 2 of the present invention will be described in reference to FIG. 1 through FIG. 3.

With regard to Embodiment 1, when a mechanical error is present, the mechanical error must be further corrected. Embodiment 2 here discloses an embodiment that corrects the mechanical error. The mechanical error here is an amount of the difference between the command position and the actual position of the front edge of the cutter, generated until the cutter starts to operate at the start of movement of the cutter due to a static frictional force, an inertia force, or the like.

Figure 3:
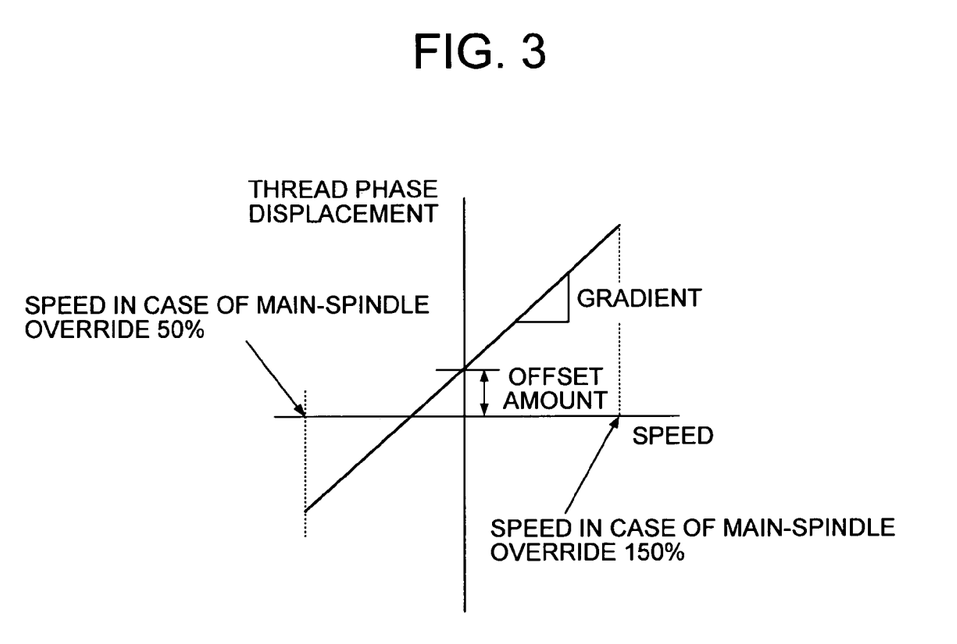
FIG. 3 is a characteristic diagram of thread phase displacement vs. the main-spindle speed, for explaining Embodiment 2 of the invention.

As the mechanical error, threading phase displacement arises, which increases or decreases in proportion to the servo feed rate difference due to variation in the main-spindle rotational frequency illustrated in FIG. 3, where (servo feed rate difference)=(servo feed rate)$_A$−(servo feed rate)$_B$.

A method of correcting the phase displacement will be described.

Firstly, the threading operation is performed by the method described in Embodiment 1. On this occasion, the operation is performed while the main-spindle override is being varied by the operating board 7, for example, from 50% to 150%. In that case, depending on individual differences in threading machines, by varying the main-spindle override, for example, from 50% to 150%, positional relation displacement (thread phase displacement), which varies as illustrated in FIG. 3 and is proportional to the servo spindle feed rate, sometimes arises between the threaded portion and the front edge of the cutter. The displacement amount is separately measured by a measuring equipment or the like. The positional relation displacement between the threaded portion and the front edge of the cutter is being plotted with respect to each speed while being measured. By connecting the plotted dots with a straight line, the displacement proportional to the servo feed rate, as illustrated in FIG. 3, can be obtained. The gradient of a linear function in such a case is inputted from the operating board 7 as a parameter. The inputted gradient parameter value is stored in a parameter memory 5. The gradient parameter value is transferred to the threading computing section 3.

Moreover, depending on the individual differences in threading machines, by varying the main-spindle override, for example, from 50% to 150%, a constant positional relation displacement independent of the servo spindle feed rate, which varies as illustrated in FIG. 3, sometimes arises between the threaded portion and the front edge of the cutter. The offset amount in such a case is inputted from the operating board 7 as a parameter. The inputted gradient parameter value is stored in the parameter memory 5. The gradient parameter value is transferred to the main-spindle angle computing section 4. The main-spindle angle computing section 4 corrects the threading starting position by further adding the computational result according to the following equation to the displacement computed in Embodiment 1 (step S6).

displacement proportional to the speed=(servo feed rate difference)×(gradient parameter)+(offset parameter)

If the threading start position is shifted by this displacement proportional to the speed, the machining without positional relation displacement between the threaded portion and the cutter can be performed; however, in Embodiment 2 of the invention, by altering the threading start timing without shifting the machining start position, the machining without positional relation displacement between the threaded portion and the front edge of the cutter is performed. A method therefor will be described.

Firstly, the displacement is converted into the main-spindle angle by the main-spindle angle computing section 4 in step S7.

main-spindle angle (rev)=displacement/(thread-pitch command value (mm/rev))

Next, the main-spindle angle is converted into the threading-start timing shift. The main-spindle rotational frequency when machining a thread is "(programmed main-spindle rotational frequency (rps))×100/n", so that the following equation is derived.

threading-start timing shift (sec)=(main-spindle angle)/(programmed main-spindle rotational frequency (rps)×100/n)

The main-spindle angle computing section 4 outputs to the control shaft driving section 6 the movement start command for the servo spindle delayed by the threading-start timing shift (sec).

As described above, by altering the threading start timing, the machining without positional relation displacement between the threaded portion and the front edge of the cutter can be performed, and the machining accuracy can be further enhanced.

Embodiment 3

In Embodiment 1 and Embodiment 2 described above, the methods using the servo-following delay, the servo acceleration time-constant, and the mechanical error as computing elements for eliminating the positional relation displacement between the threaded portion and the front edge of the cutter have been described. Because elements generating the displacement in positional relation between the threaded portion and the front edge of the cutter include errors due to computational delay inside the NC device, it is obvious that, if the element is considered as a computing element for eliminating the positional relation displacement between the threaded portion and the front edge of the cutter, the accuracy is further enhanced.

Embodiment 4

At the last, Embodiment 4 of the present invention will be described in reference to FIG. 4 and FIG. 5.

Figure 4:
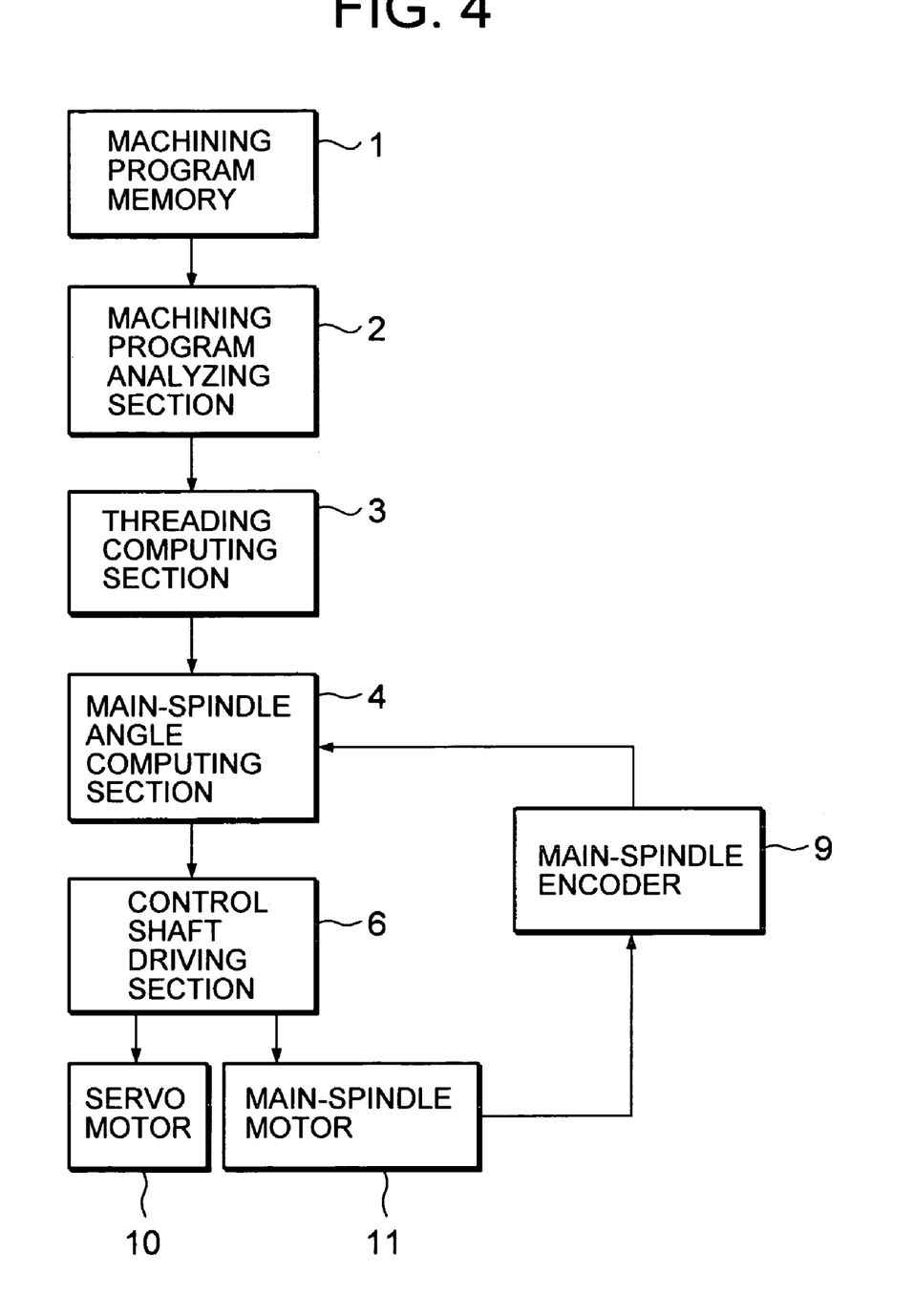
FIG. 4 is a block diagram illustrating an example of a configuration relevant to Embodiment 4 of the invention.

Embodiment 4 here is an embodiment for correcting an amount of phase displacement among the main-spindle, a tool, and a workpiece, generated when a threaded workpiece that has once been dismounted from a machine is mounted on the machine again to be threaded, or when refinishing is performed on another machine More specifically, in the machining program memory 1 illustrated in FIG. 4, a machining program (machining program including threading commands for a plurality of times of machining) is stored in advance, and, when the machining program 1 is executed, the machining program is sequentially read out from the machining program memory 1 and analyzed by the machining program analyzing section 2. When a threading command is analyzed, the feed rate of the threading servo spindle for the main-spindle command rotational frequency is computed in the threading computing section 3.

Because the servo feed rate F (mm/sec) is controlled in synchronization with the main-spindle rotational frequency transferred from the main-spindle encoder 9, given that the thread pitch command value is PIT (mm/rev) and the main-spindle rotational frequency is S (rps), the following computing equation is derived.

$$F = PIT \times S$$

The threading start timing is controlled by the main-spindle angle computing section 4. The main-spindle angle computing section 4 monitors the position of the main-spindle obtained from the main-spindle encoder 9. When the main-spindle position reaches a predetermined position, the main-spindle angle computing section 4 outputs the movement start command for the servo spindle to the control shaft driving section 6 to drive the servo motor 10.

In the present Embodiment 4, the start timing is shifted according to the later-described error amount caused by mounting again for refinishing the thread the workpiece that has once been dismounted. With regard to the displacement amount of the start timing, the main-spindle angle computing section 4 calculates the actual phase displacement amount δt from a remainder when the sum of a phase displacement amount of the threaded portion δi (mm) generated by remounting the workpiece, a delay amount of the servo system $S_D$ (mm), a delay amount from the detection of the pulse data of the main-spindle rotational frequency to the completion of the computation S1, and a delay Sacc due to acceleration/deceleration of the machine is divided by the servo feed rate F. In short, the remainder of $(\delta i + S1 + S_D + Sacc)/F$ is calculated as a distance δt (mm) of the true phase displacement. Here, Sacc in case of a linear acceleration/deceleration is expressed as below.

$$Sacc = F \times Tc/2$$

Here, Tc is an acceleration/deceleration time-constant (acceleration time-constant).

In addition, the phase displacement amount δi (mm) of the threaded portion caused by remounting the workpiece has been actually measured and stored in a memory not shown in the figure, and is read out from the memory during the above-described computation. Moreover, the delay amount of the servo system $S_D$ (mm) and the delay amount from the detection of the pulse data of the main-spindle rotational frequency to the completion of the computation S1 are computed, for example, as disclosed in Japanese Patent Laid-Open No. 99020/1987. Moreover, the acceleration/deceleration time-constant Tc has been stored in a memory not shown in the figure, and is read out from the memory during the above-described computation.

Then, based on the calculated actual phase displacement amount δt, the main-spindle angle computing section 4 computes the start timing from the phase displacement amount, and adjusts the start timing.

Moreover, the adjusting time ts of the start timing can be calculated as below.

$$ts = \delta t/F$$

Figure 5:
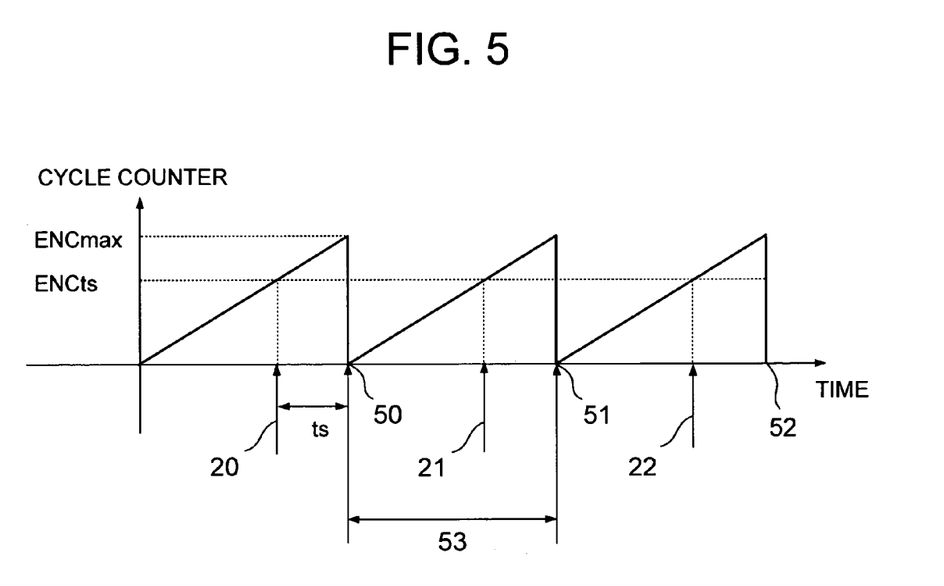
FIG. 5 is a diagram illustrating threading start timing when the phase of threading is corrected, relevant to Embodiment 4 of the invention.

Next, the threading start timing is adjusted as illustrated in FIG. 5 using above ts.

More specifically, FIG. 5 is a diagram illustrating the threading start timing when the threading phase is corrected. Given that the counter value of the counter in the encoder 9 for a single rotation is ENCmax, the time for the main-spindle to make a single rotation is the time indicated by numeral 53. Because phase alignment is required in threading, here, for example, if the threading start is set at the time when the feedback counter value of the encoder 9 is zero, in other words, if the threading is started (if the servo motor is activated) at the time such as 50, 51, or 52, the phase alignment can be achieved.

It is required for remachining that the threading start timing is shifted by the amount in consideration of the above-described phase displacement amount. The increment size of the feedback counter in the encoder ENCts for the time ts is expressed as below.

$$ENCts = \text{remainder of } (S \times ts/ENCmax)$$

Accordingly, if the threading start timing is shifted earlier by ENCts, more specifically, if the threading is started when the counter value is (ENCmax-ENCts), phase displacement due to remounting of the workpiece can be eliminated.

Consequently, as illustrated in FIG. 5, by starting the threading (by outputting a movement command to the control shaft driving section 6, and driving the servo motor 10, to start moving the cutter) at times 20, 21, or 22, earlier by the shift amount ts, more specifically, when the counter value is (ENCmax-ENCts), the phase displacement due to remachining of the thread can be corrected without shifting the threading start position.

In addition, considering also in Embodiment 4 the mechanical error that has been described in Embodiment 2, the thread machining accuracy is further enhanced.

INDUSTRIAL APPLICABILITY

As described above, the threading control method and the system therefor, relevant to the present invention, are suited to be used as a threading control method and a system therefor that are used in cases in which a thread is rough-machined and finish-machined, in which a threaded workpiece that has once been dismounted from the machine is mounted again on the machine to be threaded, or in which refinishing of the thread is performed on another machine.

What is claimed is:

1. A threading control method for performing a threading operation on a workpiece by moving, in synchronization with rotation of a main spindle on which the workpiece is mounted, either a cutter or the workpiece in a feeding spindle direction which is a central axis direction of the workpiece rotated by the main spindle, the method comprising:
    outputting a thread-pitch command value and a programmed main-spindle rotation frequency by using a machining program;
    calculating a first servo feed rate of a feeding spindle that controls the cutter based on the thread-pitch command value and the programmed main-spindle rotation frequency;
    calculating a second servo feed rate of the feeding spindle based on the thread-pitch command value, the programmed main-spindle rotation frequency and a main-spindle override value received from an external source;
    calculating, when the workpiece is threaded either at a second feed rate different from a previous first feed rate, or on a second machine different from a previously used first machine, a main-spindle threading-start timing shift based on the first servo feed rate, the second servo feed rate, and a servo-spindle acceleration time-constant of the feeding spindle; and
    altering a threading-start timing to thread the workpiece based on the calculated main-spindle threading-start timing shift.

2. A threading control method according to claim 1, wherein when the workpiece is threaded on the second machine different from the previously used first machine, the threading start timing is altered based on a mechanical error due to a difference between the first machine and the second machine.

3. A threading control method according to claim 2, wherein the mechanical error due to the difference between the first machine and the second machine includes a component of the thread phase displacement, in accordance with a feeding spindle feed rate of the feeding spindle.

4. A threading control method according to claim 3, wherein the mechanical error due to the difference between the first machine and the second machine includes a constant component of the thread phase displacement, independent of a feeding spindle feed rate of the feeding spindle.

5. A threading control method according to claim 2, wherein the mechanical error due to the difference between the first machine and the second machine includes a constant component of the thread phase displacement, independent of a feeding spindle feed rate of the feeding spindle.

6. A threading control method according to claim 1, wherein a component of the thread phase displacement, in accordance with a feeding spindle feed rate of the feeding spindle, and a constant component of the thread phase displacement, independent of the feeding spindle feed rate are inputted as parameters, and the threading start timing is altered based on the input parameters.

7. The threading control method of claim 1, wherein the servo-spindle acceleration time constant represents a time for the cutter to reach the first servo feed rate from a current feed rate of the cutter, and wherein the servo-spindle acceleration time constant is selected from a plurality of prestored servo-spindle acceleration time constants based on at least the first servo feed rate and the current feed rate of the cutter.

8. A threading control system for performing a threading operation on a workpiece by moving, in synchronization with rotation of a main spindle on which the workpiece is mounted, either a cutter or the workpiece in a feeding spindle direction which is a central axis direction of the workpiece rotated by the main spindle, the system comprising:
    a machining program analyzing section which outputs a thread-pitch command value and a programmed main-spindle rotation frequency;
    a threading computing section which receives the thread-pitch command value and the programmed main-spindle rotation frequency output by the machining program analyzing section, and which calculates a first servo feed rate of a feeding spindle that controls the cutter based on the received thread-pitch command value and the programmed main-spindle rotation frequency, and which calculates a second servo feed rate of the feeding spindle based on the thread-pitch command value, the programmed main-spindle rotation frequency, and an override input received from an external source; and
    a main-spindle angle computing section which calculates, when the workpiece is threaded either at a second feed rate different from a previous first feed rate, or on a second machine different from a previously used first machine, a main-spindle threading-start timing shift based on the first servo feed rate, the second servo feed rate, and a servo-spindle acceleration time-constant of the feeding spindle, and which alters a threading-start timing to thread the workpiece based on the calculated main-spindle threading-start timing shift.

9. A threading control system according to claim 8, wherein the main-spindle angle computing section alters the threading start timing based on a variable component of the thread phase displacement, in accordance with a feeding spindle feed rate of the feeding spindle, and based on a constant component of the thread phase displacement, independent of the feeding spindle feed rate, which are input as parameters.

10. A threading control system according to claim 8, wherein, when the workpiece is threaded on the second machine different from the previously used first machine, the threading start timing is altered based on a mechanical error due to a difference between the first machine and the second machine.

11. A threading control system according to claim 10, wherein the mechanical error due to the difference between the first machine and the second machine includes a component of the thread phase displacement, in accordance with a feeding spindle feed rate of the feeding spindle.

12. A threading control system according to claim 11, wherein the mechanical error due to the difference between the first machine and the second machine includes a constant component of the thread phase displacement, independent of a feeding spindle feed rate of the feeding spindle.

13. A threading control system according to claim 10, wherein the mechanical error due to the difference between the first machine and the second machine includes a constant component of the thread phase displacement, independent of a feeding spindle feed rate of the feeding spindle.

14. The threading control system of claim 8, wherein the servo-spindle acceleration time constant represents a time for the cutter to reach the first servo feed rate from a current feed rate of the cutter, wherein the first servo feed rate is determined based on an input command, and wherein the main-spindle angle computing section selects the servo-spindle acceleration time constant from a plurality of prestored servo-spindle acceleration time constants based on at least the first servo feed rate and the current feed rate of the cutter.

* * * * *